Oct. 12, 1954     R. R. SAMPSELL     2,691,534
BOAT TRAILER
Filed Dec. 24, 1952
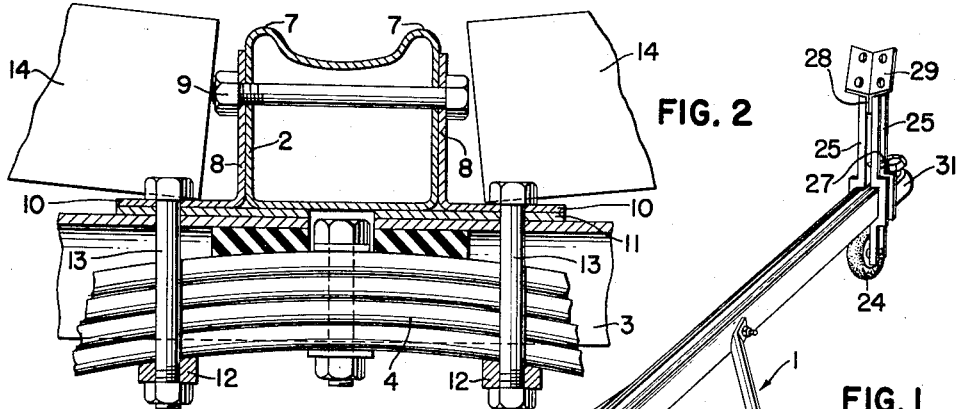
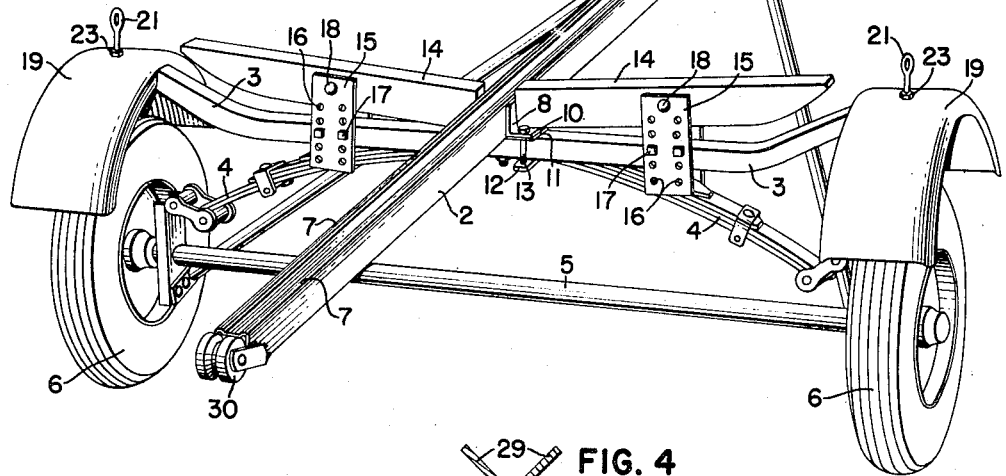
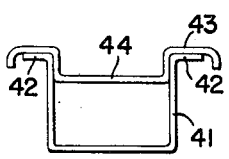
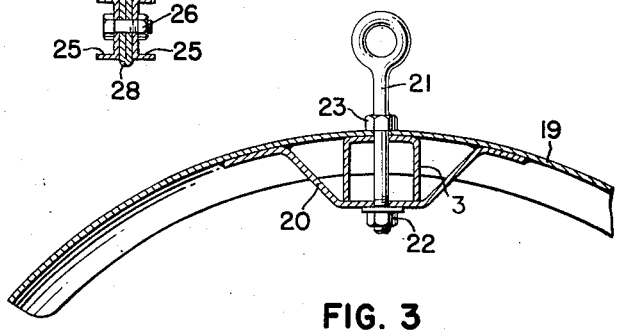
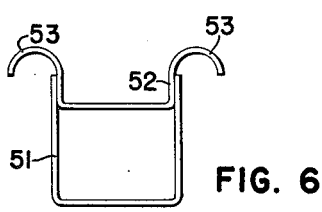
*INVENTOR.*
RALPH R. SAMPSELL
BY
*Oldham & Oldham*
ATTORNEYS

Patented Oct. 12, 1954

2,691,534

UNITED STATES PATENT OFFICE 2,691,534

BOAT TRAILER

Ralph R. Sampsell, Youngstown, Ohio

Application December 24, 1952, Serial No. 327,824

7 Claims. (Cl. 280—414)

This invention relates to trailers, and especially to a small trailer especially adapted for carrying boats.

Heretofore there have been various types of trailers provided and some of these have had special constructions to adapt them for carrying boats, particularly when the trailer is pulled behind an auto or other vehicle. One problem that arises in trailer construction, is to adapt the trailer for use with a variety of sizes and shapes of boats, as the keels and bottom constructions of different types of boats vary widely. Thus it has been difficult to provide a trailer that can be used with any of a number of boats of widely different lengths and bottom and keel shapes. Still another problem in trailers of this general type is that of securing the transverse or cross frame member to the remainder of the construction by means which are of sturdy construction and which lend themselves readily to trailer construction. When transporting a boat on a trailer, it frequently is desirable to place a tarpaulin or other member over the boat so that in many instances it is desirable to have ropes used with the trailer to aid in retaining the boat on the trailer, or to aid in retaining a tarpaulin on the boat, while the boat is on the trailer and being moved. It also is difficult to secure or provide adjustable boat supports in a trailer so that it will readily adapt itself, or it can be adjusted so that it will accommodate boats of widely different shape and length on such trailer for transporting the boat positioned thereon.

The foregoing and other disadvantages of known types of trailers have made the provision of a universal type of a boat trailer a difficult problem to solve.

The general object of the present invention is to provide a trailer of the class described wherein the trailer is characterized by its ability to be adapted to carry any of a number of widely different sized and shaped boats thereon.

Another object of the invention is to provide a sturdy, relatively inexpensive trailer especially adapted for transporting boats thereon.

Another object of the invention is to provide a boat trailer with improved means thereon for securing a fender to the trailer and for providing rope anchoring means in the trailer.

Yet another object of the invention is to provide a special adjustable member in a boat trailer for snugly engaging and supporting the prow portion of a boat on a trailer and any of a variety of different lengths and shapes of boats received on the trailer.

A further object of the invention is to provide improved apparatus for securing the longitudinal frame of a trailer to the cross frame and spring means of the trailer.

Still another object of the invention is to provide a sturdy center frame in a trailer, which frame is longitudinally recessed for receiving a boat keel therein.

The foregoing and other objects and advantages of the invention will be made more apparent as the specification proceeds.

For a better understanding of the invention, attention is directed to the accompanying drawings, wherein:

Fig. 1 is a perspective view of one boat trailer embodying the principles of the invention;

Fig. 2 is a fragmentary, enlarged vertical cross section of the boat trailer of the invention at the connection between the longitudinal and cross frame members of the trailer;

Fig. 3 is an enlarged vertical section through a fender of the trailer of Fig. 1;

Fig. 4 is an enlarged horizontal section through the prow-engaging portion of the trailer of Fig. 1; and Figs. 5 and 6 are vertical sections through modifications of the longitudinal frame member of the trailer as shown in Fig. 1.

The invention relates to a trailer which has a longitudinally extending center frame that has a longitudinally recessed upper surface for receipt of a boat keel therein, means extending transversely of the center frame and operatively carried thereby for engaging a boat, a prow-engaging member operatively and adjustably carried by the center frame adjacent the front end thereof, a leaf spring unit extending transversely of the trailer and associated with the transversely extending means of the trailer, and bolt and angle means for securing the longitudinally extending center frame to the transversely extending means and leaf spring unit of the trailer.

In referring to the drawings and the following specification, corresponding numerals are used to identify corresponding parts so that comparison between the drawings and the specification is facilitated.

In order to understand the invention completely, reference now is had to the details of the structure shown in the drawings, and a trailer I is indicated in the drawings with this trailer I comprising a center frame or beam 2 which has a cross frame 3 operatively associated therewith. A leaf spring unit 4 is also provided in the trailer I while an axle 5 is used to position a pair of wheels 6 that comprise the primary support for the trailer 1.

The center frame or beam 2 usually is of hollow construction and may be made from a metal tube of suitable size. Figure 2 of the drawings best shows that a pair of longitudinally extending shoulders 7 are provided on opposed lateral margins of the center frame 2 so that a recessed center portion is provided in this frame for receipt of the keel of a boat carried by the trailer 1. Thus the keel of the boat can be retained by the center frame 2 intermediate the shoulders 7 to prevent such boat from moving transversely of the trailer 1. The drawing clearly shows that the grooved upper surface of the center frame or beam 2 at the center portion thereof intermediate the shoulder 7 provides a keel support surface spaced below the top of the center frame less than one-half the width of such center frame. Fig. 2 of the drawings also shows that a pair of angles 8 are secured to the center frame 2 by a bolt 9 or similar member so that the angles 8 are positioned immediately adjacent and above the cross frame 3 and have support legs lying parallel to and adjacent the upper surface of the cross frame 3. Usually the cross frame is made from a downwardly open channel so that the leaf spring unit 4 can be received within the cross frame 3 at the center of the trailer. Usually a support plate 11 is positioned intermediate the lower legs 10 of the angles 8 and the upper surface of the cross frame and suitable pressure plates 12 usually are positioned below the leaf spring unit 4 so that suitable bolts 13 may extend through the legs 10, support plate 11 and pass along by the leaf spring unit and through the pressure plates 12 so that such bolts 13 will fixedly secure the cross frame and leaf spring unit to the center frame 2 of the trailer. U-bolts or other similar means may be used in place of the bolts 13 if desired.

Support blocks 14 are shown as being adjustably carried on the cross frame 3 by support brackets or plates 15. Usually a pair of plates 15 are associated with each of the blocks 14 with one block 14 being positioned on each section formed in the cross frame 3 by center frame 2. A plurality of holes 16 are provided in these support plates 15 for receiving bolts 17 that in turn engage holes in the cross frame 3 so that the plates 15 and the blocks 14 can be positioned in desired height relation to the cross frame 3. A bolt or rivet 18 extends through each of the pairs of plates 15 for securing the block 14 thereto.

Fig. 3 of the drawings best shows that a fender 19 may be positioned at each end of cross frame 3 and such fender 19 is positioned at the lateral extremity of the cross frame 3 and has a bridge plate 20 usually secured thereto, as by spot welds between the bridge plate and fenders at spaced portions thereof and with such bridge plate 20 being in tight contact or engagement with the lower surface of the cross frame 3. An I-bolt 21 is shown extending through suitable apertures formed in the fender 19, cross frame 3 and bridge plate 20 with a nut 22 on the lower end of the I-bolt being used to draw the I-bolt into tight engagement with the assembled apparatus by means of a lock nut or lug 23 on the shank of the I-bolt 21. Thus the I-bolts 21 are provided as convenient anchors for ropes or other means used to aid in securing a boat on the trailer 1, or to aid in tying down tarpaulins or other similar members on a boat carried by the trailer.

A boat keel may engage the bottom of the recess in the beam 2, or the shoulders 7 may limit lateral movement of the keel dependent upon the particular shape of the boat on the trailer 1.

It will be observed that the blocks 14 are supported substantially near the center thereof but that the laterally inner ends of such blocks are also adapted to be carried by the support angles 8 on the legs 10 thereof. Thus the blocks will automatically adapt themselves to a different pivotal position from those shown in the drawings if the bottom of a boat carried by the trailer requires pivotal movement of such blocks above the support bolts or rivets 18 used to position the blocks in the trailer.

In order to engage the prow or front portion of a boat carried by the trailer 1, a prow-engaging unit is adjustably carried by the center frame 2 and this prow unit comprises a support wheel 24 that is positioned by a pair of channels 25 or similar members that extend up around the center frame 2 and which usually are secured together by a bolt 26 extending between the support channels 25 at the top portion thereof. Usually support rivets or bolts 27 extend between the channels 25 immediately below and above the center frame 2 so that such bolts 27 normally will secure the channels 25 firmly to the center frame 2. The actual prow-engaging portion for the trailer of the invention is shown as comprising a plate 28 that is of substantially Y-shape in section and which is secured intermediate the channels 25 by the bolt 26. Preferably only one bolt is used to position the plate 28 so that it is pivotally positioned and by loosening the bolt 26, the position of a plate 28 may be varied so that exposed, opposed portions 29 of the plate 28 can be adjusted in position so that they will snugly engage the prow of a boat on the trailer.

Usually the rear end of the center frame 2 carries a suitable loading roller 30 thereon while conventional trailer coupling means 31 are carried by the leading end of the center frame 2 and of such size to prevent any possible slipping of the support wheel 24 and its associated means forwardly out of engagement with the center frame 2.

Fig. 5 shows a modified type of a support center frame or unit wherein a channel 41, which is of substantially C-shape in section is provided and which channel has support legs 42 provided on its upper edges. Such legs 42 are used to support a carrier plate 43 which has a recessed center portion 44 for use in locating a keel of a boat carried by the trailer on the center line of the trailer for aiding in preventing lateral movement of such transported boat.

Yet another modified channel 51 is shown in Fig. 6 and it has a carrier plate 52 suitably positioned over the open upper surface of the channel 51. This carrier plate 52 may have arcuate upper edges as indicated at 53 so that a recessed center portion is provided in the carrier plate and the carrier plate will easily engage with a boat positioned on the trailer. It will be appreciated that the carrier plates 43 and 52 may be welded to or otherwise secured to the channels 41, or 51, respectively, if required.

It will be understood that the invention has provided a sturdy, easily constructed boat trailer which has very desirable properties and which aids in locating the keel of a boat at the center line of the trailer. The boat trailer has means adapting it to carry a variety of styles and sizes of boats safely, and the components of the trailer are secured together in an easily assembled but sturdy manner so that the objects of the invention have been achieved.

While several complete embodiments of the invention have been disclosed herein, it will be appreciated that modification of these particular embodiments of the invention may be resorted to without departing from the scope of the invention as defined in the appended claims.

What is claimed is:

1. In a trailer, a longitudinal frame, a downwardly open channel shaped in section cross frame, a pair of angles secured to opposite sides of said longitudinal frame, a leaf spring unit received in said cross frame and extending transversely of the trailer, cushion means between said leaf spring unit and the top of said cross frame, and bolt means extending through said angles and around said leaf spring unit and cross frame to secure said longitudinal frame to said cross frame.

2. In a trailer, a longitudinal frame, a downwardly open channel shaped in section cross frame, a pair of supports secured to opposite sides of said longitudinal frame and extending laterally therefrom, a leaf spring unit received in said cross frame and extending transversely of the trailer, and means engaging said supports and extending around said leaf spring unit and cross frame to secure said longitudinal frame and said cross frame together and to secure said leaf spring unit in said cross frame.

3. In a trailer, a longitudinal frame, a downwardly open channel shaped in section cross frame, a pair of angles secured to opposite sides of said longitudinal frame, a leaf spring unit received in said cross frame and extending transversely of the trailer, means engaging said angles and extending around said leaf spring unit and cross frame to secure said longitudinal frame to said cross frame, and boat support means pivotally and adjustably carried by said cross frame for positioning to engage and conform to the shape of the bottom of a boat on the trailer.

4. In a boat trailer, a generally tubular center frame comprising a lower section of substantially C-shape in transverse section, and an upper carrier plate operatively carried by said lower section and extending laterally therefrom, said upper carrier plate having a recessed center portion for receiving a boat keel therein and a pair of support shoulders at the lateral margins thereof, a transversely directed frame member secured to said center frame, and support wheels operatively engaging said transversely directed frame means.

5. A boat trailer as in claim 4 wherein said center frame lower section has support flanges thereon at its upper margin engaging said support shoulders of said carrier plate.

6. In a boat trailer, frame means including a longitudinally directed center frame member extending substantially the full length of the boat to be carried, the center frame member having a continuous longitudinally grooved upper surface for slidably receiving a boat's keel therein, a pair of wheels operatively engaging the frame means somewhat rearwardly of the center of balance of the frame member to allow tilting of the trailer in the pitching direction so that in loading and unloading of the boat from the trailer a continuous sliding action is obtained between the boat keel and the frame member regardless of the tilted relation of the trailer frame member with respect to the boat, a pair of longitudinally directed rounded shoulders on each side of the frame member extending substantially the full length thereof, said frame member including a reduced height center support section intermediate said shoulder, which support section is spaced from the top of said frame member less than one-half the distance between the laterally outer margins of said shoulders, whereby a boat keel may be supported on said support section, and laterally directed members carried by the frame means and adapted to engage a boat on the trailer to keep it from rolling sideways, the boat trailer being entirely free and clear at and above its center frame member so that the trailer may pitch and engage a boat at any portion of said center frame member.

7. In a boat trailer, a longitudinally directed hollow integral center frame member extending substantially the full length of the boat to be carried, the center frame member having a continuous longitudinally grooved upper surface for slidably receiving a boat's keel therein, the grooved upper surface of the center frame member forming a keel support spcaced below the top of the center frame member less than one-half the width thereof, a pair of wheels operatively engaging the frame member somewhat rearwardly of the center of balance of the frame member to allow tilting of the trailer in the pitching direction so that in loading and unloading of the boat from the trailer a continuous sliding action can be obtained between the boat keel and the frame member regardless of the tilted relation of the center frame member with respect to the boat, the center frame member being completely accessible at any part thereof for engaging a boat at any angle of pitch of the trailer, and laterally directed members operatively associated with the center frame member for engaging a boat on the trailer to keep it from rolling sideways.

References Cited in the file of this patent

UNITED STATES PATENTS

| Number | Name | Date |
|---|---|---|
| 1,135,213 | Shaver | Apr. 13, 1915 |
| 1,517,134 | Wade | Nov. 25, 1924 |
| 1,774,198 | Drumm | Aug. 26, 1930 |
| 1,779,887 | Melanson | Oct. 28, 1930 |
| 2,292,646 | McIntosh et al. | Aug. 11, 1942 |
| 2,332,991 | Commire | Oct. 26, 1943 |
| 2,401,683 | Gordon | June 4, 1946 |
| 2,442,248 | Sampsell | May 25, 1948 |
| 2,503,535 | Yarbrough | Apr. 11, 1950 |
| 2,506,718 | Grant | May 9, 1950 |
| 2,536,563 | Montgomery | June 2, 1951 |
| 2,558,418 | Brueckman | June 26, 1951 |
| 2,571,213 | Cunningham et al. | Oct. 16, 1951 |
| 2,586,485 | Schroeder | Feb. 19, 1952 |
| 2,608,418 | Finlayson et al. | Aug. 26, 1952 |
| 2,660,443 | Miller | Nov. 24, 1953 |

FOREIGN PATENTS

| Number | Country | Date |
|---|---|---|
| 326,446 | Germany | Sept. 29, 1920 |

OTHER REFERENCES

Mastercraft Boat Trailer on page 76 of March 1950 issue of "Motorboat" (periodical), vol. 47, No. 3. Also, other illustrations and/or description on pages 142, 147, 148 of the January 1950 issue of same magazine, vol. 47, No. 1.

Mastercraft Boat Trailers (brochure), 1950, Series 200.